United States Patent Office.

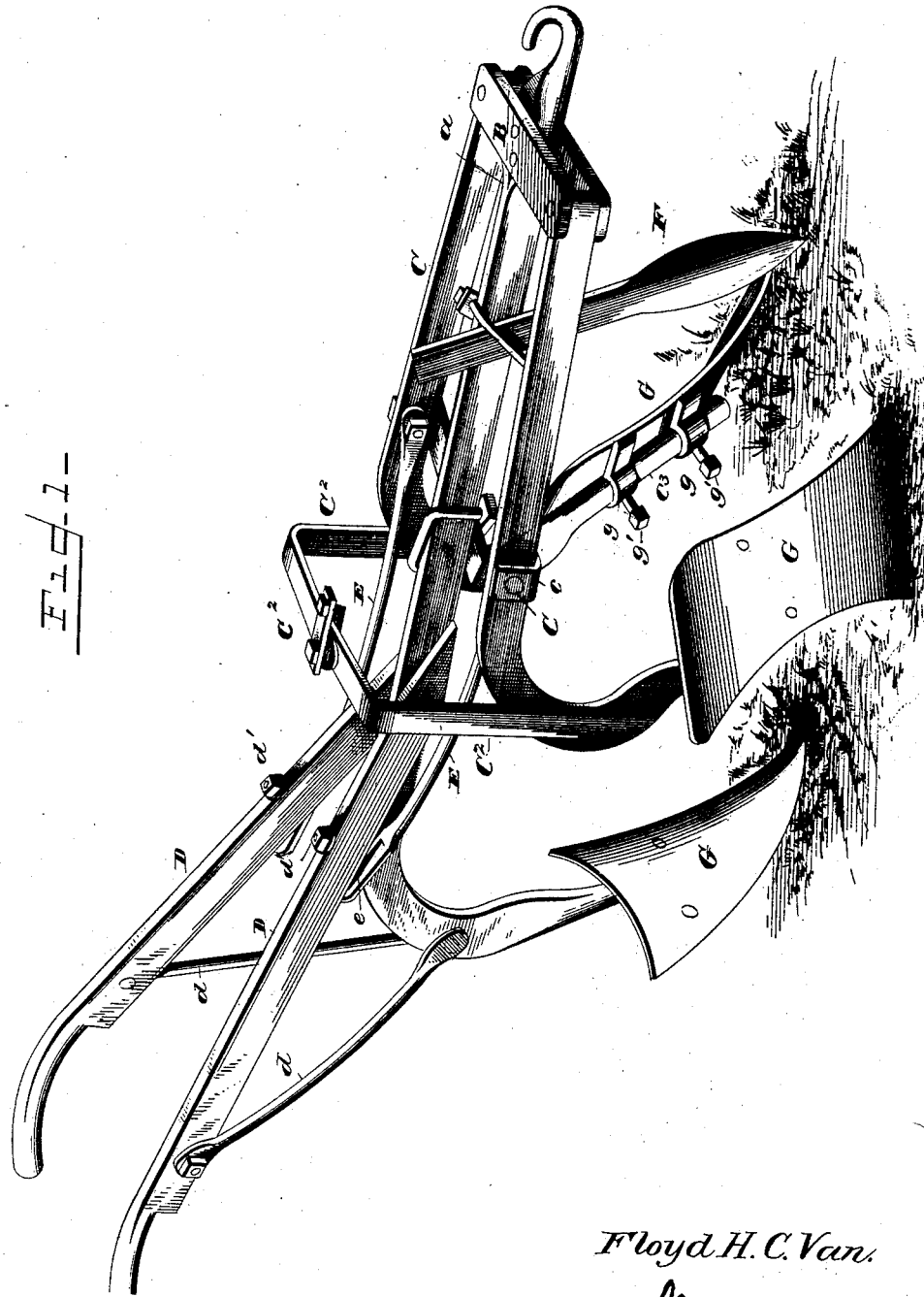

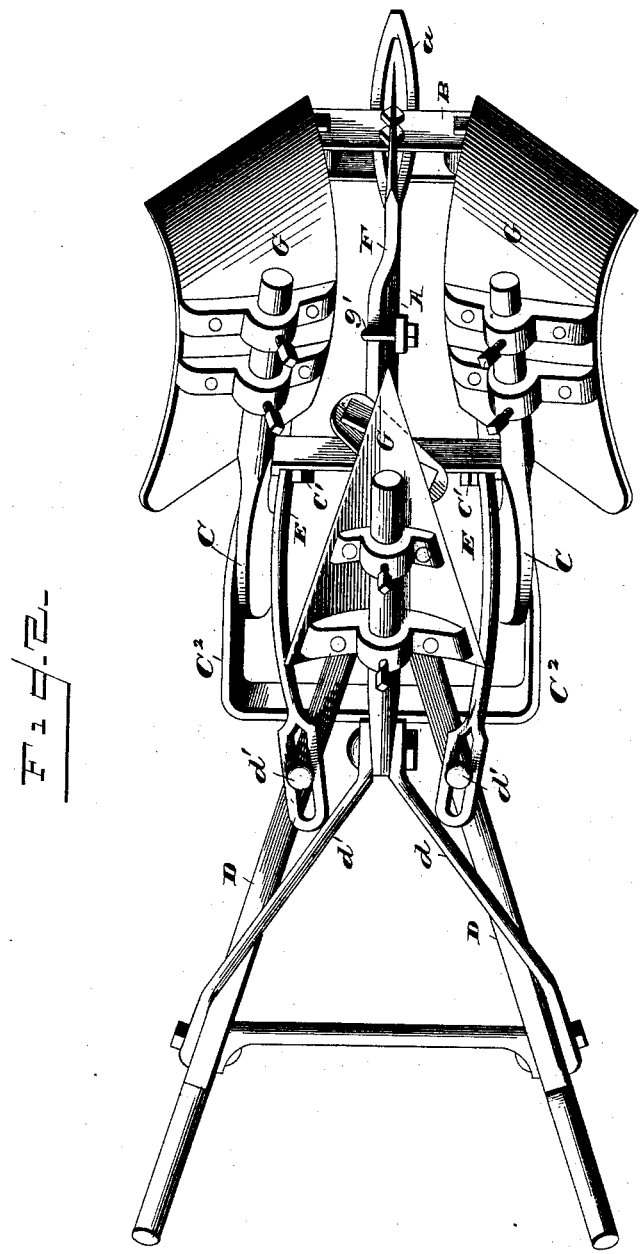

FLOYD HENRY CAREY VAN, OF WATERPROOF, LOUISIANA.

CULTIVATOR.

SPECIFICATION forming part of Letters Patent No. 367,684, dated August 2, 1887.

Application filed February 4, 1887. Serial No. 226,601. (No model.)

*To all whom it may concern:*

Be it known that I, FLOYD HENRY CAREY VAN, a citizen of the United States, residing at Waterproof, in the parish of Tensas and State of Louisiana, have invented certain new and useful Improvements in Cultivators, of which the following is a full, clear, and exact description.

My invention relates to that class of cultivators having a central plow-beam and side beams adjustable laterally with relation to the central beam.

The object of my invention is to produce a simple durable cultivator in which adjustments can be easily and quickly made; and to this end the invention consists in special features of construction and combinations, to be hereinafter described and claimed.

In the accompanying drawings, Figure 1 is a perspective view of a cultivator embodying my improvements. Fig. 2 is an inverted plan view thereof.

The central plow-beam, A, is provided at its forward end with a hook, $a$, or other means for attaching the draft devices, and just in rear of said hook a vertical loop or eye, $a'$, is formed for the reception of a bolt, $b$, which connects a cross-head, B, to the beam. To the outer ends of this cross-head are pivoted the forward ends of the side beams, C, to each of which is secured by a bolt, $c'$, at a distance from the forward end, the outer end of a brace-strap, $c$. The inner ends of these brace-straps cross each other beneath the central plow-beam, A, and are adjustably secured together and to said beam by a clip or shackle, C'.

To the downwardly-bent rear ends of the side beams, C, are secured the lower ends of arch-bars $C^2$, the upper inwardly-extending ends of which cross each other at a point above the central plow-beam, and are adjustably connected by a clip or shackle, $c^2$.

Rearwardly-extending handles D are bolted rigidly to the central plow-beam, additional rigidity being secured by diagonal braces $d$, extending from the downwardly-bent rear end of said central beam upward and outward to near the outer ends of the handles.

Brace-rods E are secured at their forward ends to the side beams, C, by bolts $c'$, which hold the brace-straps $c$, the rear ends of these brace-rods being adjustably connected to the handles D by bolts $d'$, passing through said handles and through slots $e$, formed at the rear ends of the brace-rods.

A colter, F, is clipped to the central plow-beam, as shown.

The lower ends of the plow-beams forming the plow-standards $a^3 c^3$ are round in cross-section, to provide for the circular adjustment of the plows G, which are provided with circular sockets $g$, adapted to fit said beam ends, and with set-screws $g'$, by which they may be clamped tightly when properly adjusted.

It will be noticed that the construction is extremely simple and admits of many adjustments to render the cultivator serviceable under varying conditions—as, for instance, the plows may be adjusted longitudinally on their standards to work deep or shallow, or they may be adjusted circularly to bring their faces at a greater or less angle to the line of draft, or they may be removed and replaced by plows or implements of different form. By the adjustment of side beams, C, the distance between the plows G may be increased or diminished, and as these side beams are braced to the center beam by brace-straps C and to the handles by brace-rods E, and to each other by the arch-bars $C^2$, they are rendered very rigid. The handles are also very rigidly secured, being braced to the center beam by brace-rods $d$ and to the side beams by the adjustable brace-rods E.

I claim—

In a cultivator, the combination, with the center beam provided with handles and a cross-head, and the side beams pivoted to the cross-head, of brace-straps secured rigidly to the side beams and adjustably to each other and to the center beam, brace-rods secured rigidly to the side beams and adjustably to the handles, and the arch-bars secured rigidly to the side beams and adjustably to each other at a point above the center beam, substantially as described.

FLOYD HENRY CAREY $\underset{\text{mark.}}{\overset{\text{his}}{\times}}$ VAN.

Attest:
N. B. HUNTER,
GEO. H. HUNTER.